United States Patent [19]
Shackle

[11] Patent Number: 5,416,388
[45] Date of Patent: May 16, 1995

[54] ELECTRONIC BALLAST WITH TWO TRANSISTORS AND TWO TRANSFORMERS

[75] Inventor: Peter W. Shackle, Arlington Heights, Ill.

[73] Assignee: Motorola Lighting, Inc., Buffalo Grove, Ill.

[21] Appl. No.: 164,183

[22] Filed: Dec. 9, 1993

[51] Int. Cl.⁶ ............................................. H05B 37/02
[52] U.S. Cl. ................................. 315/219; 315/247; 315/276; 315/278; 315/DIG. 5
[58] Field of Search .................... 315/209 R, 219, 247, 315/276, 278, DIG. 2, DIG. 5, DIG. 7

[56] References Cited

U.S. PATENT DOCUMENTS

| | | | |
|---|---|---|---|
| 4,017,785 | 4/1977 | Perper | 321/4 |
| 4,045,711 | 8/1977 | Pitel | 315/209 R |
| 4,075,476 | 2/1978 | Pitel | 315/209 R |
| 4,188,660 | 2/1980 | Knoll | 315/205 X |
| 4,188,661 | 2/1980 | Bower et al. | 315/205 X |
| 4,808,887 | 2/1989 | Fuhnrich et al. | 315/247 |
| 5,010,277 | 4/1991 | Courier de Mere | 315/200 |
| 5,130,610 | 7/1992 | Kakitani | 315/219 |

FOREIGN PATENT DOCUMENTS 2115627  2/1982  United Kingdom .

OTHER PUBLICATIONS

"A Half Bridge, Self-Oscillating, Multi-Resonant Converter Circuit", Peterson, W. A. & Saint-Pierre, R., 1993 IEEE, pp. 77–84.

Primary Examiner—Robert J. Pascal
Assistant Examiner—Haissa Philogene
Attorney, Agent, or Firm—J. Ray Wood

[57] ABSTRACT

A power factor corrected electronic ballast circuit uses two transformer components. An inductively coupled charge pump technique is used for power factor correction while the gates of the transistor switches are driven directly from a resonant inductor.

7 Claims, 1 Drawing Sheet

ELECTRONIC BALLAST WITH TWO TRANSISTORS AND TWO TRANSFORMERS

BACKGROUND OF THE INVENTION

Electronic ballast circuits are required to provide AC (alternating current) power to a gas discharge lamp in a manner which is uniform over time (i.e. has low ripple in the lamp current envelope) and such that the current drawn from the AC power line is sinusoidal and in phase with the line voltage. In addition, it is desirable that the cost of the components used to achieve this should be relatively low. The most expensive components used in an electronic ballast circuit are the magnetic components which are usually transformers or inductors. If the ballast is operating at a high frequency compared to the AC line frequency, then a so called EMI (electromagnetic interference) filter to prevent electronic noise from escaping onto the AC power line is usually needed. In order to force a sinusoidal current through a gas discharge lamp, one other magnetic component is needed to resonate with a resonant capacitor and produce the sinusoidal current waveforms desired. Although non-power factor corrected ballasts have previously been described using only these two transformers, it is desirable for purposes of cost reduction to have a power factor corrected ballast which functions using only two transformers.

DESCRIPTION OF THE PREFERRED EMBODIMENT

Figure 1:
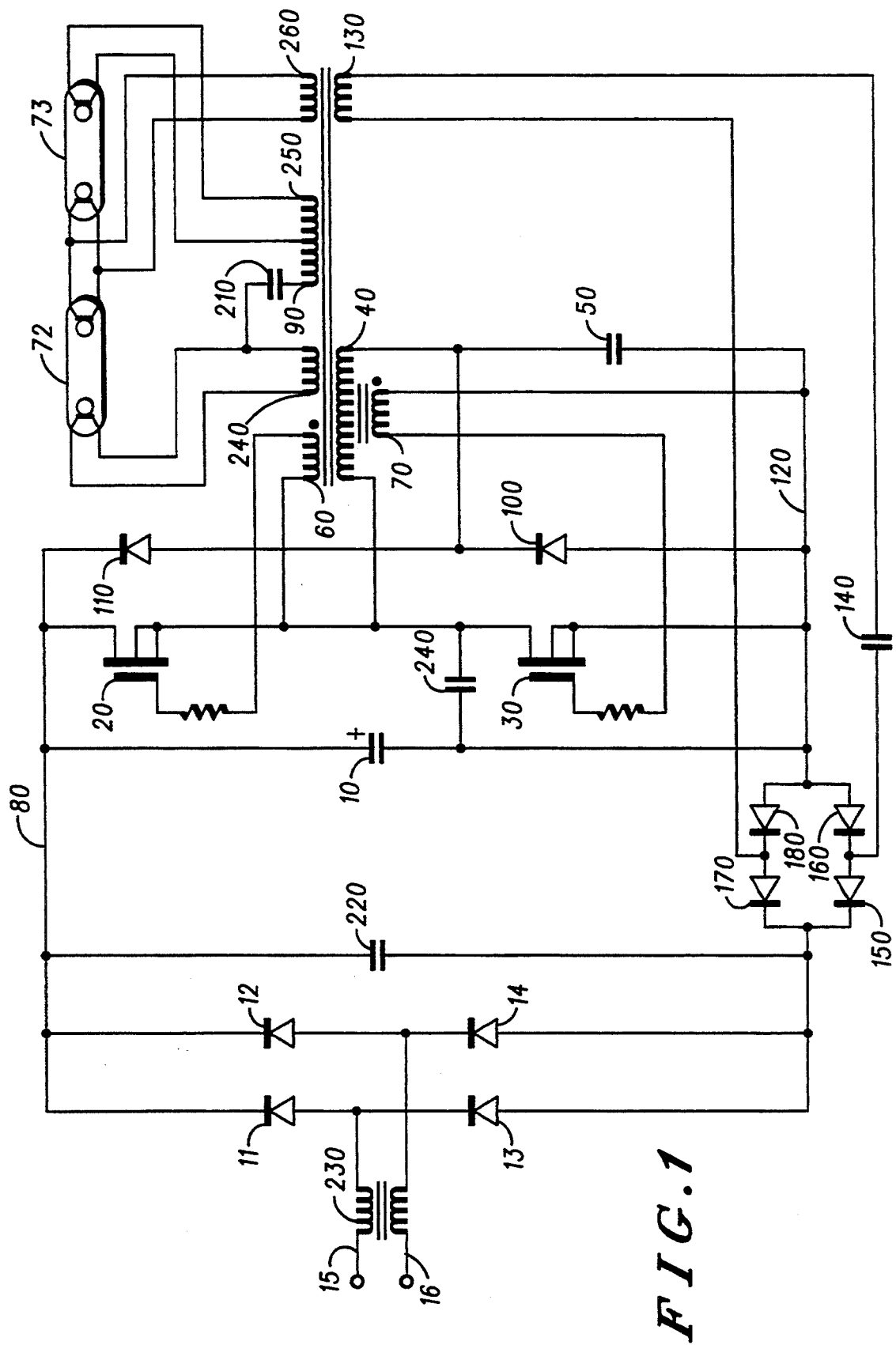
FIG. 1 shows an illustration of a circuit for an electronic ballast which uses two transistors and two transformer components.

The subject of this invention is a power factor corrected electronic ballast circuit which only uses two transformer components. This is accomplished by using charge pump techniques for power factor correction while driving the gates of the transistor switches directly from a resonant inductor. This allows the ballast to be assembled using only two magnetic components. The ballast is therefore less expensive than other similar power factor corrected ballasts.

In FIG. 1 storage capacitor 10 is charged by rectifier diodes 11, 12, 13 and 14 from AC power line terminals 15 and 16. It maintains a relatively constant source of DC (direct current) power for half bridge transistors 20 and 30. Half bridge transistors 20 and 30 are switched on alternately. This arrangement of switching transistors is called a half bridge inverter. The half bridge transistors 20 and 30 drive from their mid-point a series resonant circuit consisting of resonant inductor 40 and resonant capacitor 50. The drives for the control electrodes, in this case the gates, of transistors 20 and 30 are derived from additional windings 60 and 70 wound on the inductor 40.

To understand the operation of the circuit, consider the case where transistor 20 was in an "on" condition, so that current was flowing down from power rail 80, through transistor 20 and resonant inductor 40, and into resonant capacitor 50. The current will be increasing at a rate controlled by the inductance of resonant inductor 40. The polarity of the gate drive winding 60 is such that this increasing current produces a voltage on the winding 60 which drives transistor 20 on even harder. Eventually, as resonant capacitor 50 becomes charged, the current in resonant inductor 40 stops increasing. The corresponding voltage from winding 60, which is proportional to the rate of change of the current through inductor 40, then becomes zero, turning off transistor 20. A feedback condition is then produced in which the turning off of transistor 20 produces a negative rate of change of the current through resonant inductor 40 so that a negative gate voltage is applied to the gate of transistor 20, turning it hard off, while a positive gate voltage is applied by winding 70 to the gate of transistor 30, turning it hard on.

In this manner, the state of half bridge transistors 20 and 30 switches alternately from transistor 20 being on to transistor 30 being on, and back again. The duration of each successive "on" period is on the order of one quarter of the resonant period of resonant inductor 40 in combination with resonant capacitor 50. Thus, the ensuing oscillation is taking place at a frequency well above the resonant frequency of these components. If the system is loaded by connecting discharge lamps 72 and 73 across output winding 90, then the effect of the load is that during the "on" period of each transistor the current through inductor 40 will stop increasing more quickly than it would have done otherwise. In other words, the system responds to an increase in load by increasing its frequency. Since it is already operating above resonance, then an increase in frequency results in a lowering of the AC voltage amplitude across the inductor 40 and a corresponding lowering of the output voltage applied to the load. Because the voltage falls as the load current increases, this system drives the discharge lamps with a relatively high output impedance, tending to force a somewhat constant current through the lamps, as is required for stable operation.

When the load is removed, the amplitude of the voltage swing across inductor 40 increases greatly as the operating frequency moves towards resonance. The amplitude of these oscillations is limited by the presence of clamping diodes 100 and 110, which prevent the voltage at the center point of inductor 40 and capacitor 50 from going above or below the power rails 80 and 120 respectively. The power rail 120 is called "circuit common." The exact point and amount of this clamping action may be adjusted by using tapping points or autotransformer extensions on inductor 40 rather than simply connecting the clamping diodes to the junction of inductor 40 and capacitor 50.

Since the voltage across inductor 40 consists of a relatively constant AC voltage in normal operation, this voltage may be used for the purpose of power factor correction, as follows. A power factor correction winding 130 is placed upon the same core as resonant inductor 40. Winding 130 is used to drive a high frequency rectifier bridge consisting of diodes 150, 160, 170, and 180 through capacitor 140. This high frequency rectifier bridge driven through capacitor 140 acts in the circuit as if it were a floating voltage source with an internal resistive impedance inversely proportional to the value of capacitor 140. The number of turns on power factor correction winding 130 is adjusted so that the open circuit voltage coming from the floating voltage source is equal to the voltage on storage capacitor 10, which is somewhat less than the peak voltage of the AC power line. Thus, when an alternating voltage is applied to the input terminals 15, 16, since the voltage of the storage capacitor 10 is masked by the equivalent series voltage of the floating voltage source, the only limitation to the current which flows in through rectifier diodes 11, 12, 13 and 14 is the internal impedance of the floating voltage source, which is a resistance. In this manner the current which flows into the circuit from terminals 15, 16 is caused to be proportional to the sinusoidal applied input voltage, and thus is sinusoidal and in phase with the applied voltage as is required to draw current from the AC power line with a good power factor.

With the circuit operating as just described, when the incoming AC line voltage is close to its peak value, maximum currents flow through capacitor 140 so that its full value is coupled to the resonant inductor 40, lowering the switching frequency. This raises the output voltage and drives more current through the load. Conversely, when the line voltage is near zero, little or no current flows through capacitor 140. Thus, capacitor 140 does not lower the switching frequency of the system, resulting in a relatively higher frequency and correspondingly lower output voltage. The net result will be that the lamp current will show a fluctuation in amplitude through the line cycle, having greatest amplitude at high line voltage and vice versa. This undesirable effect is counteracted by including current limiting capacitor 210 in series with the lamps 72 and 73. Since the impedance of a capacitor is inversely proportional to the frequency, then when the lamp current would be high at the peak line voltage, the reduced frequency which accompanies this will act with capacitor 210 to moderate the increase in lamp current or even remove it altogether. The net result is that the lamp current remains relatively constant through the power line cycle, with at most a residual ripple at a frequency of four times the power line frequency.

Capacitor 220 operates in conjunction with transformer 230 to prevent high frequency signals from the operation of the circuit from propagating out onto the AC power line. Snubber capacitor 240 reduces the rate of change of voltage at the node between transistors 20 arid 30 which results in a smoothing of the lamp current waveform. Auxiliary windings 240, 250 and 260 are used to power the heating filaments of the gas discharge lamp in the conventional manner.

A circuit built in accordance with these principles may display a power factor of 0.97, total harmonic distortion of 17% and a total ripple amplitude in the; lamp current envelope of 10%.

I claim:

1. A circuit for powering a gas discharge lamp from a source of AC power comprising:
    a first rectifier coupled to the source of AC power;
    a half bridge inverter having a pair of series connected transistors, each transistor having a control electrode, the pair of transistors having a shared terminal;
    a series connected inductor and resonant capacitor connected between a circuit common and the shared terminal;
    the inductor having a winding, the winding inductively coupled to a power factor correction winding, the power factor correction winding providing a signal used for power factor correction, the power factor correction winding also coupled to the input of a high frequency rectifier bridge, the output of the high frequency rectifier bridge coupled to the first rectifier;
    the control electrodes of the transistors inductively coupled to the inductor; and
    a lamp circuit having the lamp and a series connected current limiting capacitor, the lamp circuit coupled to the inductor.

2. The circuit of claim 1 where the lamp circuit is inductively coupled to the inductor.

3. The circuit of claim 2 where the clamping diodes are coupled to the inductor for preventing excessive voltage swings across the inductor.

4. The circuit of claim 3 where the inductor is inductively coupled to a heater winding, the gas discharge lamp having heating filaments, the heater winding coupled to the heating filaments.

5. A circuit for powering a gas discharge lamp from a source of AC power comprising:
    a first rectifier coupled to the source of AC power:
    a half bridge inverter having a pair of series connected transistors, each transistor having a control electrode, the pair of transistors having a shared terminal;
    a series connected inductor and resonant capacitor connected between a circuit common and the shared terminal;
    the inductor having a winding, the winding inductively coupled to a power factor correction winding, the power factor correction winding providing a signal, the signal used for power factor correction, to the input of a high frequency rectifier bridge, the output of the high frequency rectifier bridge coupled to the first rectifier:
    the control electrodes of the transistors inductively coupled to the inductor;
    a lamp circuit having the lamp and a series connected current limiting capacitor, the lamp circuit coupled to the resonant capacitor.

6. The circuit of claim 5 where clamping diodes are coupled to the inductor for preventing excessive voltage swings across the inductor.

7. The circuit of claim 5 where the inductor is inductively coupled to a heater winding, the gas discharge lamp having heating filaments, the heater winding coupled to the heating filaments.

* * * * *